United States Patent
Allen et al.

(10) Patent No.: US 10,121,386 B2
(45) Date of Patent: *Nov. 6, 2018

(54) LEARNING MODEL FOR DYNAMIC COMPONENT UTILIZATION IN A QUESTION ANSWERING SYSTEM

(71) Applicant: International Business Machines Corporation, Armonk, NY (US)

(72) Inventors: Corville O. Allen, Morrisville, NC (US); Kyle L. Croutwater, Chapel Hill, NC (US); Kevin B. Haverlock, Cary, NC (US); Michael D. Whitley, Weddington, NC (US)

(73) Assignee: International Business Machines Corporation, Armonk, NY (US)

( * ) Notice: Subject to any disclaimer, the term of this patent is extended or adjusted under 35 U.S.C. 154(b) by 464 days.

This patent is subject to a terminal disclaimer.

(21) Appl. No.: 14/872,307

(22) Filed: Oct. 1, 2015

(65) Prior Publication Data

US 2016/0019805 A1    Jan. 21, 2016

Related U.S. Application Data

(63) Continuation of application No. 13/843,103, filed on Mar. 15, 2013, now Pat. No. 9,171,478.

(51) Int. Cl.
*G09B 7/00* (2006.01)
*G09B 7/02* (2006.01)

(52) U.S. Cl.
CPC .............. *G09B 7/00* (2013.01); *G09B 7/02* (2013.01)

(58) Field of Classification Search
CPC ... G09B 7/02; G09B 7/00; G06N 5/04; G06N 99/005; G06N 5/02; G06N 5/003; G06Q 30/02

USPC ............................................. 706/46; 434/322
See application file for complete search history.

(56) References Cited

U.S. PATENT DOCUMENTS

| | | |
|---|---|---|
| 2007/0067293 A1 | 3/2007 | Yu |
| 2007/0203863 A1 | 8/2007 | Gupta et al. |
| 2008/0026360 A1 | 1/2008 | Hull |
| 2009/0070311 A1 | 3/2009 | Feng |
| 2009/0075246 A1 | 3/2009 | Stevens |
| 2009/0287678 A1 | 11/2009 | Brown et al. |
| 2009/0325140 A1 | 12/2009 | Gray et al. |

(Continued)

OTHER PUBLICATIONS

USPTO U.S. Appl. No. 13/843,103, 2 pages.

(Continued)

*Primary Examiner* — Dave Misir
(74) *Attorney, Agent, or Firm* — Stephen R. Tkacs; Stephen J. Walder, Jr.; Reza Sarbakhsh

(57) ABSTRACT

Mechanisms are provided in a data processing system for utilizing algorithms based on categories in a question answering system. The mechanisms capture a history of performance and correctness metrics for identifying efficiency of respective algorithms for finding answers to questions in respective question categories in a question answering system. The mechanisms determine sets of algorithms to use for respective question categories according to efficiency and correctness analysis. The mechanisms determine a question category of a given input question and execute a set of algorithms corresponding to the question category of the given input question that meet an efficiency threshold to contribute to finding a correct answer for the given input question.

20 Claims, 3 Drawing Sheets

(56) References Cited

U.S. PATENT DOCUMENTS

| | | |
|---|---|---|
| 2011/0066587 A1 | 3/2011 | Ferrucci et al. |
| 2011/0106617 A1 | 5/2011 | Cooper et al. |
| 2011/0125734 A1 | 5/2011 | Duboue et al. |
| 2012/0078888 A1 | 3/2012 | Brown et al. |
| 2013/0007055 A1 | 1/2013 | Brown et al. |
| 2013/0017524 A1 | 1/2013 | Barborak et al. |
| 2013/0018652 A1 | 1/2013 | Ferrucci et al. |
| 2013/0029307 A1 | 1/2013 | Ni et al. |
| 2013/0066886 A1 | 3/2013 | Bagchi et al. |
| 2013/0171605 A1 | 7/2013 | Tang |

OTHER PUBLICATIONS

"A System and Method to Identify Correct Candidates for Question Answering Over Structured Knowledge", IBM; IPCOM No. IPCOM000180748D, www.ip.com, hhtp://www.ip.com/pubview/IPCOM000180748D, Mar. 16, 2009, 4 pages.

Cao, Yonggang et al., "AskHermes: An online question answering system for complex clinical questions", Journal of Biomedical Informatics 44 (2011) 277-288 Jan. 21, 2011 , pp. 277-288.

Ferrucci, D A. , "Introduction to "This is Watson"", IBM Journal of Research and Development, vol. 56, No. 3/4, Paper 1, May/Jul. 2012, pp. 1:1-1:15. May/Jul. 2012 , 15 pages.

High, Rob, "The Era of Cognitive Systems: An Inside Look at IBM Watson and How it Works", IBM Corporation, Redbooks, Dec. 12, 2012, 16 pages.

Lally, A et al., "Question analysis: How Watson reads a clue", IBM Journal of Research and Development, vol. 56, No. 3/4, Paper 2, May/Jul. 2012, pp. 2:1-2:14.

McCord, M.C. et al., "Deep parsing in Watson", IBM J. Res. & Dev. vol. 56 No. 3/4 Paper 3, May/Jul. 2012, pp. 3:1-3:15.

Tellez-Valero, A. et al., "Learning to Select the Correct Answer in Multi-Stream Question Answering", Information Processing & Management, vol. 47, No. 6, Nov. 2011, 15 pages.

Yuan, Michael J. , "Watson and healthcare, How natural language processing and semantic search could revolutionize clinical decision support", IBM developerWorks, IBM Corporation, Apr. 12, 2011, 14 pages.

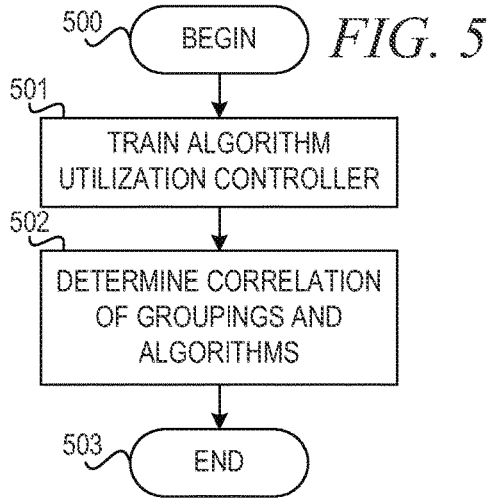
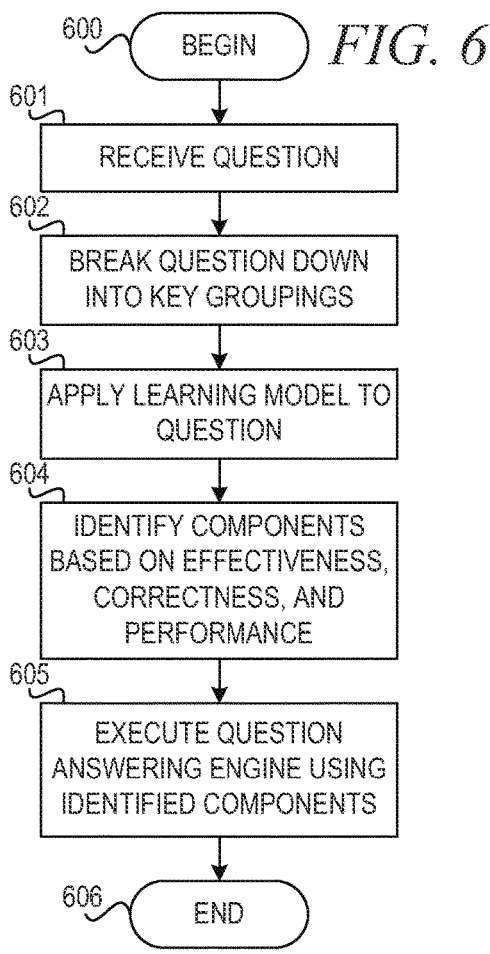
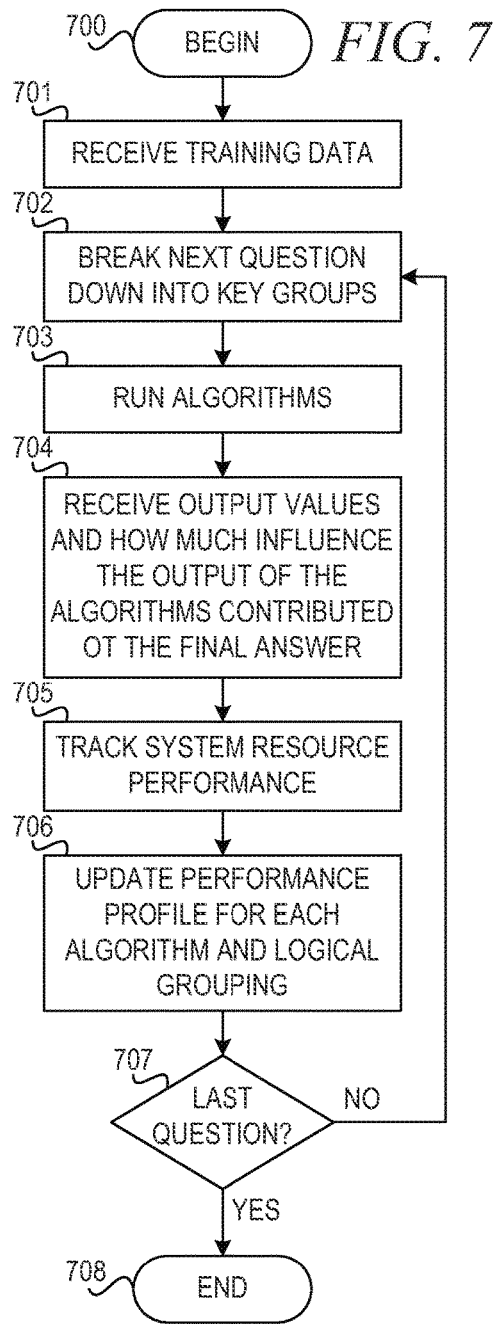

LEARNING MODEL FOR DYNAMIC COMPONENT UTILIZATION IN A QUESTION ANSWERING SYSTEM

BACKGROUND

The present application relates generally to an improved data processing apparatus and method and more specifically to mechanisms and a learning model for dynamic component utilization in a question answering system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

In any given deep question answering system, there is no one golden algorithm that will provide the analysis necessary to understand and answer a question. As a result, many systems utilize hundreds of algorithms to parse, to decompose a question, and to formulate answers. However, all algorithms are not equal. Some algorithms are computationally difficult, while some may rely on large quantities of pre-computed data. Thus, creating a system that is generalized enough to handle open domain questions, while still achieving performance goals is an immense undertaking.

SUMMARY

In one illustrative embodiment, a method, in a data processing system, is provided for utilizing algorithm components based on categories in a question answering system. The method comprises capturing a history of performance and correctness metrics for identifying efficiency of respective algorithms for finding answers to questions in respective question categories in a question answering system. The method further comprises determining sets of algorithms to use for respective question categories according to efficiency and correctness analysis. The method further comprises for a given input question, determining a question category of the given input question. The method further comprises executing a set of algorithms corresponding to the question category of the given input question that meet an efficiency threshold to contribute to finding a correct answer for the given input question.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is a flowchart illustrating operation of a question answering system for building a learning model in accordance with an illustrative embodiment;

FIG. 6 is a flowchart illustrating dynamic algorithm component utilization in a question answering system in accordance with an illustrative embodiment; and FIG. 7 is a flowchart illustrating training an algorithm utilization component in a question answering system in accordance with an illustrative embodiment.

DETAILED DESCRIPTION

Figure 1:
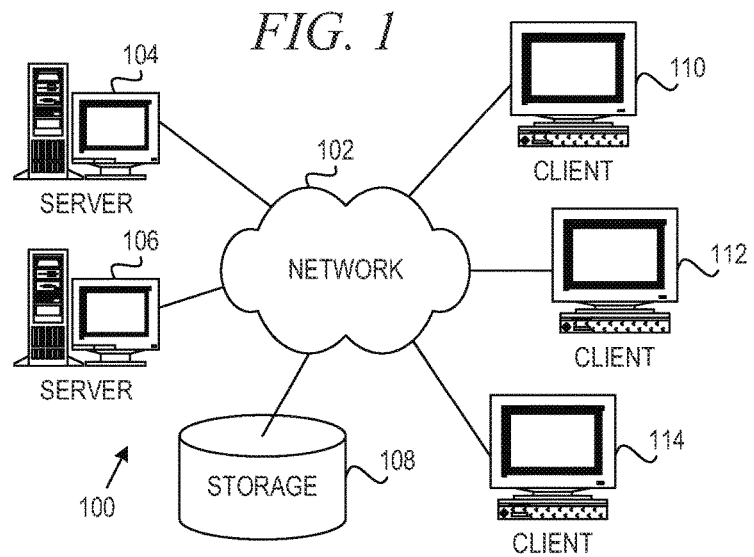
FIG. 1 depicts a pictorial representation of an example distributed data processing system in which aspects of the illustrative embodiments may be implemented.

The illustrative embodiments provide a mechanism and a learning model for dynamic component utilization in a question answering system. The mechanism comprises a controller or broker that controls which components (implementations of algorithms) are run. The controller takes as input the question; the question can be classified into logical groupings. An example of logical groups may include, for example, medical-longform-general, medical-symptom, medical-disease, medical-treatment, etc. The controller also receives runtime information that can be used to train on. The training data may comprise the results, for a particular logical grouping, of what algorithms were run and the overall system performance. This creates a generalized performance profile for various logical groupings. A machine learning system is employed to take the performance profiles as training data and to maximize the ability of the system to produce high confidence question answering while minimizing the required resources. Once a machine learning model is produced, the system uses that model to classify, in real time, input data from a client and dynamically control the components and resources.

As will be appreciated by one skilled in the art, the present invention may be embodied as a system, method, or computer program product. Accordingly, aspects of the present invention may take the form of an entirety hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
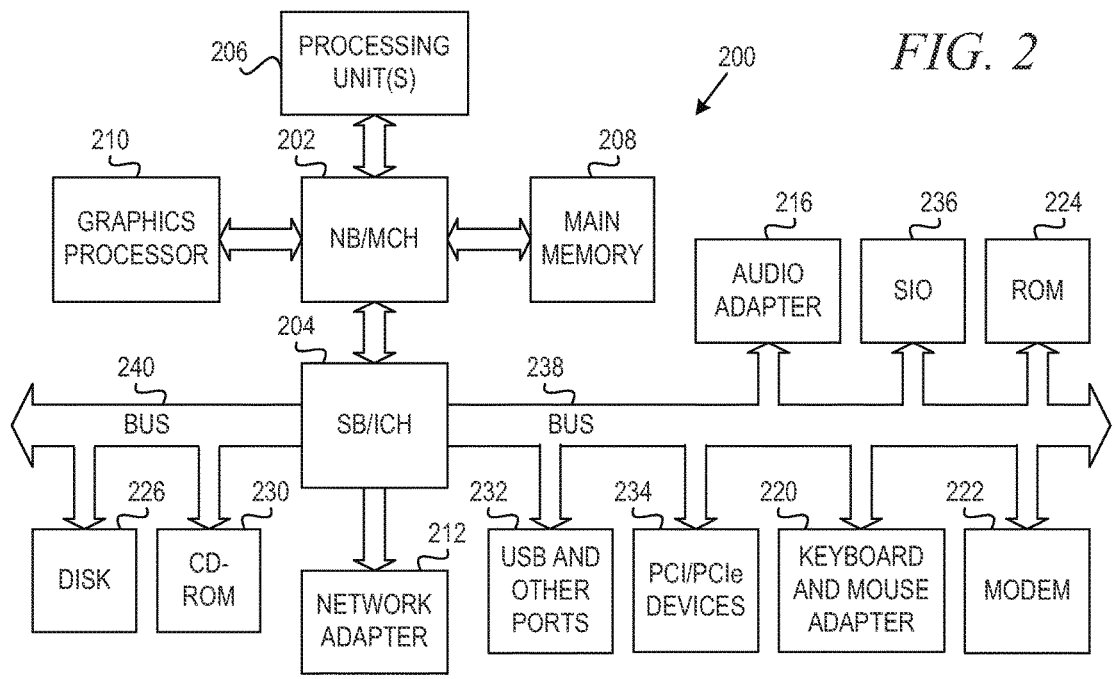
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 12 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SR/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Returning to FIG. 1, in accordance with an illustrative embodiment, a question answering system is implemented in data processing system 100, for example, on one or both of servers 104, 106. In one example embodiment, the resources of servers 104, 106 are provided in a cloud computing or other hosted environment in which the customer incurs cost based on resource usage. One approach to implementing a question answering system that is general enough to handle open domain questions, while still achieving performance goals, is to require human intervention to select combinations of algorithms that are best suited for a particular class of questions.

Ablating any set of algorithms can often prove a fruitless endeavor; many algorithms may overlap and only when they are used together do they provide an overall benefit to the system. Alternatively, one can run all available algorithms for a given question and leave it to a machine learning algorithm to sort out which algorithms produced meaningful results, but then one may end up running algorithms understanding complex medical diagnoses when trying to answer a financial question. This creates a balancing act of sorts: which algorithms provide the most comprehensive coverage of a question, and give the best possible probability the system can understand and/or answer the question, while at the same time minimizing resource usage and maximizing performance goals.

Figure 3:
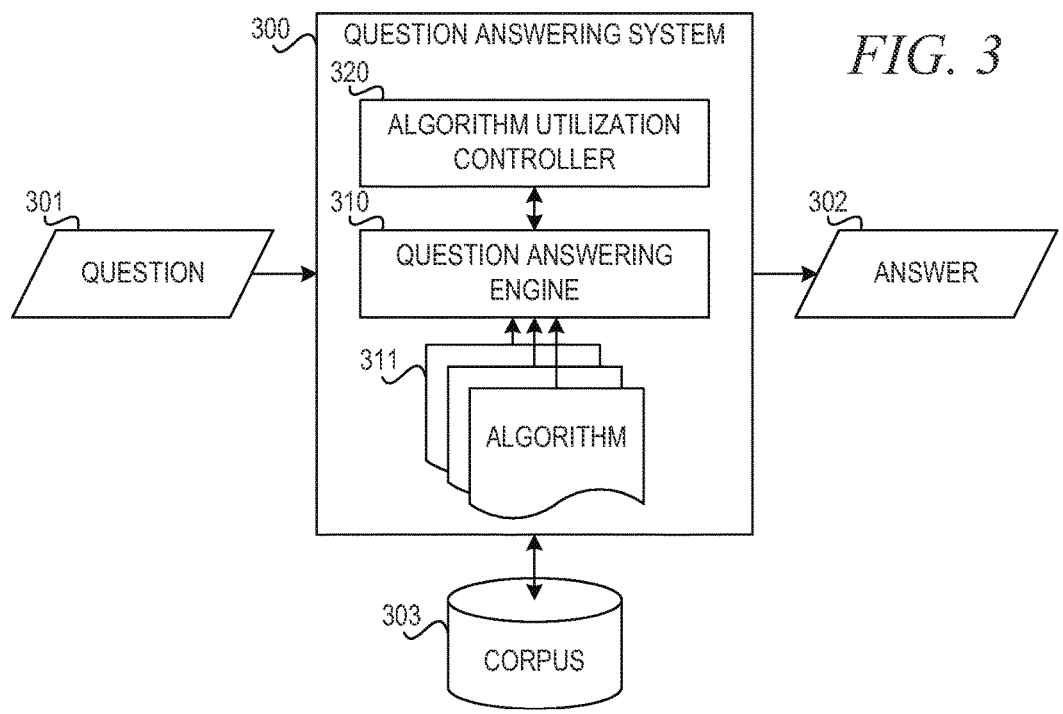
FIG. 3 is a block diagram depicting a question answering system in accordance with an illustrative embodiment.

FIG. 3 is a block diagram depicting a question answering system in accordance with an illustrative embodiment. Question answering (QA) system 300 receives a question 301 and provides an answer 302 based on information in corpus 303, e.g., a collection of electronic documents that may be operated on by the QA system. As mentioned above, QA systems, such as question answering system 300, provide an automated tool for searching large sets of electronic documents, or other sources of content, based on an input question to determine a probable answer to the input question and a corresponding confidence measure. IBM's Watson™ is one such QA system. Examples of providing answers to questions from a corpus are described in U.S. Patent Application Publication No. 2009/0287678 and U.S. Patent Application Publication No. 2009/0292687, which are herein incorporated by reference in their entirety.

In one embodiment, the QA system 300 imports one or more electronic documents from a corpus 303 of data. This may include retrieving the documents from an external source, such as a storage device in a local or remote computing device. The documents may be processed so that the QA system 300 is able to interpret the content of each document. This may include parsing the content of the documents to identify statements found in the documents and other elements of the content, such as in the metadata associated with the documents, informational statements listed in the content of the documents, or the like. The system 300 may parse documents using document markup. In such an embodiment, an XML parser may be used to find appropriate document parts. In another embodiment, the documents are parsed using native language processing (NLP) techniques. The QA system 300 may use language processing techniques to parse the documents into sentences and phrases, for example.

Within question answering system 300, question answering engine 310 includes logic for performing analysis to break down question 301 and information in corpus 303 to generate answer 302, which is determined to have a high probability of being an accurate answer to question 301. Question answering engine 310 uses algorithms 311 to perform the analysis. Algorithms 311 comprise specialized software components that perform portions of the analysis. For example, algorithms 311 may provide logic to separate or codify question 301 and/or information in corpus 303 into semantic constructs or conceptual constructs and to perform pattern matching, keyword matching, image analysis, or any known analysis techniques for extracting information from unstructured content.

For a specific domain of questions, QA system 300 may utilize a small subset of algorithms 311 that are specialized for the domain. However, for a generalized QA system 300 capable of handling open domain questions, QA system 300 may utilize hundreds of algorithms 311 in various combinations depending on the question posed. However, all algorithms are not equal. Some algorithms are computationally difficult, while some may rely on large quantities of pre-computed data in corpus 303. Furthermore, not all algorithms contribute equally to an accurate result. Moreover, while individual algorithms may not contribute directly to the answer, multiple algorithms may work in concert to perform significant analysis to understand the question 301 or the corpus 303 of data or to formulate the answer 302.

In accordance with an illustrative embodiment, QA system 300 comprises algorithm utilization controller 320, which controls which algorithm components 311 are run for a given question 301. Algorithm utilization controller 320 takes as input the question 302, which can be classified into logical groupings. Examples of logical groupings may include, for example, medical-longform-general, medical-symptom, medical-disease, medical-treatment, etc. Algorithm utilization controller 320 receives runtime information that can be used to train. This training data consists of the results of a particular grouping of what algorithm components 311 were run and the overall system performance.

Algorithm utilization controller 320 creates a generalized performance profile for various logical groupings. Algorithm utilization controller 320 comprises a machine learning component that receives the performance profiles as training data and maximizes the ability of the system to produce high confidence question answering while minimizing the required resources. Once algorithm utilization controller 320 produces a machine learning model, the system can use that model to classify, in real time, input data from a client and dynamically control the algorithms 311 and system resources.

Figure 4:
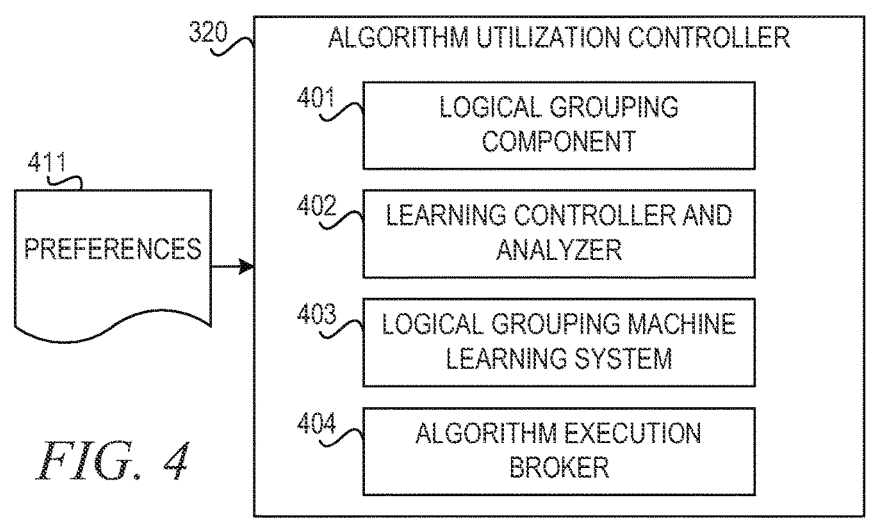
FIG. 4 is a block diagram illustrating components of an algorithm utilization controller in accordance with an illustrative embodiment.

FIG. 4 is a block diagram illustrating components of an algorithm utilization controller in accordance with an illustrative embodiment. Algorithm utilization controller 320 comprises logical grouping component 401, learning controller and analyzer 402, logical grouping machine learning system 403, and algorithm execution broker 404. Logical grouping component 401 breaks the questions and context associated with the question into groupings based on the information within the question and context.

In a training phase, the QA system 300 receives training data with associated context and predetermined logical groupings and uses algorithms 311 to find answers based on the training data. In the training phase, learning controller and analyzer 402 receives the logical groupings, the algorithms run as part of the pipeline, and their output values, and how much influence the outputs of the algorithms contributed to the final answers. Learning controller and analyzer 402 keeps track of the system resource performance. For example, learning controller and analyzer 402 may record how long an algorithm runs and how much heap/memory is used by each algorithm. Learning controller and analyzer 402 receives the output information, algorithm, time taken, system resources, and number of input data items to the algorithm and creates a performance profile for that algorithm and logical grouping.

The performance characteristics used in metrics include heap sizes, CPU utilization, memory usage, the execution time of an algorithm, file input and output access and write speeds. Typical performance characteristics in a computing environment include the number of features produced by the algorithm and the number of data structures of a specific type that is currently loaded in memory. The correctness metrics include how many features for each algorithm were produced for that logical grouping and how those features for that logical grouping impact the overall result or the algorithm itself. Finally, correctness metrics take into account, when a final answer is given, whether that answer is correct and how the features and algorithms affected the answer by weight.

In accordance with one example embodiment, the algorithms may be modified or enhanced to output the data it operates on and what inputs contributed to its output. Some algorithms may use as input data that is provided as output by another algorithm. These algorithms may be used in various combinations and these combinations may contribute to the answer to varying degrees.

In the training phase, logical grouping machine learning system 403 receives the performance profiles as training data. Logical grouping machine learning system 403 receives as input the logical groupings, question make-up and context, and results of the answers. Logical grouping machine learning system 403 makes correlations between algorithms and logical groupings to provide category-specific data. The correlation and performance profiles represent a machine learning model that can be used to intelligently select algorithms to run for a given question.

The logical grouping uses intelligence techniques including machine learning models, such as, but not limited to, Logistical Regression. The classifiers or input for the machine learning models can include in one embodiment the features and performance metrics produced by the algorithms for a logical grouping.

Algorithm execution broker 404 uses the machine learning model and the classification of the question and context in a logical grouping to determine which algorithms to run in real time. Based on the logical grouping and performance requirement, the algorithm execution broker dynamically controls which algorithms are run and the resources necessary using the machine learning model.

In accordance with one embodiment, algorithm utilization controller 320 receives a preferences profile 411, which defines preferences of the customer. Preferences profile 411 may define performance requirements, system resource restrictions, and desired accuracy of answers. Algorithm utilization controller 320, more particularly algorithm execution broker 404, selects algorithms to use for a given question based on preferences profile 411, meeting the performance requirements and system resource utilization restrictions of the customer.

The components of algorithm utilization controller 320 work in tandem to allow for a more efficient and performance generalized question answering system. As the machine learning model is built and updated, the logical grouping of questions and context can be more defined and sub-categorized, which produces a better deep question and answering system.

Logical grouping component 401 breaks the question down into key areas or groups based on the subject and the context domain. Logical grouping component 401 uses any additional context information to conform and further group the question. For well-known areas, such as healthcare or medical information, these can be matched against predefined broad groups with smaller groups.

Learning controller and analyzer 402 performs algorithm data capture, analyzes system performance, and performs logical grouping association. The algorithms identify themselves as they run and provide as output the feature set they are interested in. Learning controller and analyzer 402 assigns a weight to each algorithm based on how much each feature affected the results. Weights may be on any unified scale, such as zero to one, zero to ten, or zero to one hundred. Each algorithm may have a unified application programming interface (API) to provide weight data. Algorithms provides as output how many features are added and which features are added or modified.

Learning controller and analyzer 402 monitors heap size and memory pools. Learning controller and analyzer 402 also captures start and end time for algorithm execution. Learning controller and analyzer 402 also records the number of relevant features in the common analysis structure (CAS) and the number of CASes in the overall system. The common analysis structure in this embodiment can be generally substituted by a common data structure that is used within the overall system.

Logical grouping machine learning system 403 captures the logical groupings that affect the analyzer and uses the captured groupings to make correlations between groupings and algorithms that contribute to accurate results. Based on these correlations, logical grouping machine learning system 403 decides among multiple candidate groupings and multiple candidate sets of algorithms.

Algorithm execution broker 404 selects a set of algorithms for a given question based on the feature types and features in a CAS and based on the influence level with which these features impact the algorithm. Algorithm execution broker 404 applies the learning model to the incoming data and, if over a predetermined or dynamically determined threshold of influence, sets a given algorithm to execute.

FIG. 5 is a flowchart illustrating operation of a question answering sys for building a learning model in accordance with an illustrative embodiment. Operation begins (block 500), and the question answering system trains an algorithm utilization component (block 501). Operation of block 501 is described in further detail below with reference to FIG. 7. The algorithm utilization component determines correlations of groupings and algorithms to form a learning model (block 502). Thereafter, operation ends (block 503).

FIG. 6 is a flowchart illustrating dynamic algorithm component utilization in a question answering system in accordance with an illustrative embodiment. Operation begins (block 600), and the question answering system receives a question to be answered and associated context, if present (block 601). A logical grouping component of the question answering system breaks the question and context into key groupings (block 602). Then, the question answering system applies the learning model to the question (block 603). The question answering system identifies the algorithm components to be executed based on effectiveness, correctness, and performance (block 604). The question answering system executes the question answering engine using the identified algorithm components (block 605). Thereafter, operation ends (block 606).

FIG. 7 is a flowchart illustrating training an algorithm utilization component in a question answering system in accordance with an illustrative embodiment. Operation begins (block 700), and the algorithm utilization controller receives training data comprising a plurality of questions each having associated context (block 701). A logical grouping component in the algorithm utilization controller breaks a next question down into key groupings (block 702). The question answering system runs a plurality of algorithm components (block 703). A learning controller and analyzer component in the algorithm utilization controller receives output values and how much influence the output of the algorithms contributed to the final answer (block 704). The learning controller and analyzer tracks system resource performance (block 705). The learning controller and analyzer updates a performance profile for each algorithm and logical grouping (block 706).

Then, the algorithm utilization controller determines whether the question is the last question in the training data (block 707). If the question is not the last question in the training data, operation returns to block 702 to break the next question down into key groups. Otherwise, if the question is the last question in the training data in block 707, operation ends (block 708).

Thus, the illustrative embodiments provide mechanisms for utilizing algorithms based on categories in a question answering system. The mechanisms capture a history of performance and correctness metrics for identifying efficiency of respective algorithms for finding answers to questions in respective question categories in a question answering system. The mechanisms determine sets of algorithms to use for respective question categories according to efficiency/performance and correctness analysis. The mechanisms utilize a first set of algorithms to find a first answer to a first question in a first question category and utilizes a second set of algorithms to find a second answer to a second question in a second question category.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having a processor and a memory, wherein the memory comprises instructions which are executed by the processor to cause the processor to implement an algorithm utilization controller for utilizing algorithm components based on categories in a question answering system, the method comprising:

capturing, by a question answering engine executing within the question answering system, a history of performance and correctness metrics for identifying efficiency of respective algorithms for finding answers to a plurality of training questions in respective question categories in the question answering system, wherein the algorithms comprise specialized software components that perform portions of analysis performed by the question answering engine;

determining, by the algorithm utilization controller, sets of algorithms to use for respective question categories according to efficiency and correctness analysis, wherein the algorithm utilization controller comprises a logical grouping component, a learning analyzer component, a machine learning component, and an algorithm execution broker component working together to dynamically adjust algorithms to answer questions while minimizing resources, wherein determining the sets of algorithms comprises classifying each given training question into a question category by the logical grouping component, profiling resources to produce a performance profile for the question category for output value contributions to produce a final answer by the learning analyzer component, utilizing the performance profile for the question category as training data by the machine learning component considering confidence of answers as a weighting, and generating a machine learning model for classifying questions and adjusting algorithms dynamically by the algorithm execution broker according to a criteria adjusted for resource availability and answer correctness criteria;

for a given input question, determining, by the algorithm utilization controller, a question category of the given input question using the machine learning model;

determining, by the algorithm utilization controller, a set of algorithms corresponding to the question category of the given input question that meet an efficiency threshold to contribute to finding a correct answer for the given input question using the machine learning model; and executing, by the question answering engine, the set of algorithms corresponding to the question category of the given input question to find an answer to the given input question.

2. The method of claim 1, wherein capturing the history of performance and correctness metrics further comprises:

recording performance characteristics for each of a plurality of algorithms; and generating a performance profile for each of the plurality of algorithms for each question category.

3. The method of claim 2, wherein the performance characteristics comprise heap sizes, CPU utilization, memory usage, the execution time of an algorithm, file input and output access, or write speeds.

4. The method of claim 1, wherein determining sets of algorithms to use for respective question categories comprises:

making correlations between algorithms and logical groupings to provide a category-specific machine learning model.

5. The method of claim 4, further comprising determining which algorithms to execute and necessary system resources using a category-specific machine learning model of the determined question category.

6. The method of claim 1, wherein the correctness metrics comprise a number of features for each algorithm produced for a given logical grouping and how features for that logical grouping impact each question category.

7. A computer program product comprising a non-transitory computer readable medium having a computer readable program stored therein, wherein the computer readable program, when executed on a computing device, causes the computing device to implement an algorithm utilization controller for utilizing algorithm components based on categories in a question answering system, wherein the computer readable program causes the computing device to:

capture, by a question answering engine executing within the question answering system, a history of performance and correctness metrics for identifying efficiency of respective algorithms for finding answers to a plurality of training questions in respective question categories in the question answering system, wherein the algorithms comprise specialized software components that perform portions of analysis performed by the question answering engine;

determine, by the algorithm utilization controller, sets of algorithms to use for respective question categories according to efficiency and correctness analysis, wherein the algorithm utilization controller comprises a logical grouping component, a learning analyzer component, a machine learning component, and an algorithm execution broker component working together to dynamically adjust algorithms to answer questions while minimizing resources, wherein determining the sets of algorithms comprises classifying each given training question into a question category by the logical grouping component, profiling resources to produce a performance profile for the question category for output value contributions to produce a final answer by the learning analyzer component, utilizing the performance profile for the question category as training data by the machine learning component considering confidence of answers as a weighting, and generating a machine learning model for classifying questions and adjusting algorithms dynamically by the algorithm execution broker according to a criteria adjusted for resource availability and answer correctness criteria;

for a given input question, determine, by the algorithm utilization controller, a question category of the given input question using the machine learning model;

determining, by the algorithm utilization controller, a set of algorithms corresponding to the question category of the given input question that meet an efficiency threshold to contribute to finding a correct answer for the given input question using the machine learning model; and execute, by the question answering engine, the set of algorithms corresponding to the question category of the given input question to find an answer to the given input question.

8. The computer program product of claim 7, wherein capturing the history of performance and correctness metrics further comprises:

recording performance characteristics for each of a plurality of algorithms; and generating a performance profile for each of the plurality of algorithms for each question category.

9. The computer program product of claim 8, wherein the performance characteristics comprise heap sizes, CPU utilization, memory usage, the execution time of an algorithm, file input and output access, or write speeds.

10. The computer program product of claim 7, wherein determining sets of algorithms to use for respective question categories comprises:

making correlations between algorithms and logical groupings to provide a category-specific machine learning model.

11. The computer program product of claim 10, wherein executing the set of algorithms corresponding to the question category of the given input question comprises determining which algorithms to execute and necessary system resources using a category-specific machine learning model of the determined question category.

12. The computer program product of claim 7, wherein the computer readable program is stored in a computer readable storage medium in a data processing system and wherein the computer readable program was downloaded over a network from a remote data processing system.

13. The computer program product of claim 7, wherein the computer readable program is stored in a computer readable storage medium in a server data processing system and wherein the computer readable program is downloaded over a network to a remote data processing system for use in a computer readable storage medium with the remote system.

14. The computer program product of claim 7, wherein the correctness metrics comprise a number of features for each algorithm produced for a given logical grouping and how features for that logical grouping impact each question category.

15. An apparatus, comprising:
a processor; and
a memory coupled to the processor, wherein the memory comprises instructions which, when executed by the processor, cause the processor to implement an algorithm utilization controller for utilizing algorithm components based on categories in a question answering system, wherein the instructions cause the processor to:
capture, by a question answering engine executing within the question answering system, a history of performance and correctness metrics for identifying efficiency of respective algorithms for finding answers to a plurality of training questions in respective question categories in the question answering system, wherein the algorithms comprise specialized software components that perform portions of analysis performed by the question answering engine;
determine, by the algorithm utilization controller, sets of algorithms to use for respective question categories according to efficiency and correctness analysis, wherein the algorithm utilization controller comprises a logical grouping component, a learning analyzer component, a machine learning component, and an algorithm execution broker component working together to dynamically adjust algorithms to answer questions while minimizing resources, wherein determining the sets of algorithms comprises classifying each given training question into a question category by the logical grouping component, profiling resources to produce a performance profile for the question category for output value contributions to produce a final answer by the learning analyzer component, utilizing the performance profile for the question category as training data by the machine learning component considering confidence of answers as a weighting, and generating a machine learning model for classifying questions and adjusting algorithms dynamically by the algorithm execution broker according to a criteria adjusted for resource availability and answer correctness criteria;
for a given input question, determine, by the algorithm utilization controller, a question category of the given input question using the machine learning model;
determining, by the algorithm utilization controller, a set of algorithms corresponding to the question category of the given input question that meet an efficiency threshold to contribute to finding a correct answer for the given input question using the machine learning model; and
execute, by the question answering engine, the set of algorithms corresponding to the question category of the given input question to find an answer to the given input question.

16. The apparatus of claim 15, wherein capturing the history of performance and correctness metrics further comprises:
recording performance characteristics for each of a plurality of algorithms; and
generating a performance profile for each of the plurality of algorithms for each question category.

17. The apparatus of claim 16, wherein the performance characteristics comprise heap sizes, CPU utilization, memory usage, the execution time of an algorithm, file input and output access, or write speeds.

18. The apparatus of claim 15, wherein determining sets of algorithms to use for respective question categories comprises:
making correlations between algorithms and logical groupings to provide a category-specific machine learning model.

19. The apparatus of claim 18, wherein executing the set of algorithms corresponding to the question category of the given input question comprises determining which algorithms to execute and necessary system resources using a category-specific machine learning model of the determined question category.

20. The apparatus of claim 15, wherein the correctness metrics comprise a number of features for each algorithm produced for a given logical grouping and how features for that logical grouping impact each question category.

* * * * *